US009530242B2

(12) United States Patent
Segasby et al.

(10) Patent No.: US 9,530,242 B2
(45) Date of Patent: Dec. 27, 2016

(54) POINT AND CLICK LIGHTING FOR IMAGE BASED LIGHTING SURFACES

(71) Applicant: LIGHTMAP LIMITED, Leicestershire (GB)

(72) Inventors: Mark Segasby, Leicesterhire (GB); Simon C. Smith, Nottinghamshire (GB)

(73) Assignee: LIGHTMAP LIMITED, Leicestershire (GB)

( * ) Notice: Subject to any disclaimer, the term of this patent is extended or adjusted under 35 U.S.C. 154(b) by 0 days.

(21) Appl. No.: 14/386,452

(22) PCT Filed: Feb. 28, 2013

(86) PCT No.: PCT/GB2013/050493
§ 371 (c)(1),
(2) Date: Sep. 19, 2014

(87) PCT Pub. No.: WO2013/140124
PCT Pub. Date: Sep. 26, 2013

(65) Prior Publication Data
US 2015/0042654 A1   Feb. 12, 2015

(30) Foreign Application Priority Data

Mar. 20, 2012   (GB) .................................. 1204872.4

(51) Int. Cl.
*G06T 15/50* (2011.01)
*G06T 17/00* (2006.01)
(Continued)

(52) U.S. Cl.
CPC ............... *G06T 15/50* (2013.01); *G06T 15/06* (2013.01); *G06T 19/00* (2013.01)

(58) Field of Classification Search
CPC ........... G06T 15/06; G06T 15/50; G06T 19/00
See application file for complete search history.

(56) References Cited

U.S. PATENT DOCUMENTS 6,983,082 B2   1/2006   Duiker
2004/0095357 A1   5/2004   Oh et al.
(Continued)

OTHER PUBLICATIONS

Kevin Karsch, Kalyan Sunkavalli, Sunil Hadap, Nathan Carr, Hailin Jin, Rafael Fonte, Michael Sittig and David Forsyth, "Automatic Scene Interference for 3D Object Compositing," ACM Transactions on Graphics, vol. 28, No. 4, Article 106, Publication date: Aug. 2009.*

(Continued)

*Primary Examiner* — Sing-Wai Wu
(74) *Attorney, Agent, or Firm* — King & Schickli, PLLC

(57) ABSTRACT

A computer implemented method of interacting with a three dimensional image based lighting surface to adjust its lighting properties, comprising defining an image plane and a user viewpoint for the lighting surface; rendering and displaying a scene containing an object in situ within the lighting surface; by way of a user interaction with the displayed scene, receiving an identification of a point on the image plane; tracing a ray from the user viewpoint through the identified point on the image plane and either, determining a surface intersection point of the ray with the surface or determining an object intersection point of the ray with the object and tracing a further ray, and determining a surface intersection point of the further ray with the surface, and adjusting the lighting properties of the surface at or in the region of the surface intersection point.

10 Claims, 14 Drawing Sheets

(51) Int. Cl.
*G06T 15/06* (2011.01)
*G06T 19/00* (2011.01)

(56) References Cited

U.S. PATENT DOCUMENTS

| | | |
|---|---|---|
| 2005/0012757 A1 | 1/2005 | Park et al. |
| 2005/0017971 A1 | 1/2005 | Ard |
| 2005/0081161 A1 | 4/2005 | MacInnes et al. |
| 2007/0035707 A1 | 2/2007 | Margulis |
| 2008/0123910 A1* | 5/2008 | Zhu .................. A61B 90/36 382/128 |
| 2008/0131010 A1 | 6/2008 | Wilensky |
| 2009/0046099 A1 | 2/2009 | Duca et al. |
| 2010/0253685 A1 | 10/2010 | Segasby et al. |
| 2010/0302244 A1 | 12/2010 | Best |
| 2011/0080570 A1 | 4/2011 | Sunohara |
| 2012/0120054 A1 | 5/2012 | Sandrew et al. |
| 2013/0229413 A1 | 9/2013 | Geggie et al. |

OTHER PUBLICATIONS

Schoeneman et al., Proc. of the 20th Annual Conf. on Computer Graphics and Interactive Techniques, Siggraph '93, pp. 143-146 (1993) XP055073451.

Poulin et al., Computer Graphics Intl., 1997 Proc. Hasselt and Diepenbeek, Belgium Jun. 23-27, 1997, IEEE Comput. Soc. pp. 56-63 (Jun. 23, 1997) XP010232303.

Lightmap Labs: Sneaky Peek: Part 1, retrieved from the Internet, URL: http://www.hdrlightstudio.com/blog/lightmap-labs/lightmap-labs-sneaky-peek-part-1/; retrieved on Feb. 28, 2013.

Okabe et al., Illumination Brush: Interactive Design of Image-based Lighting, Technical Report MSR-TR-2006-112 (Aug. 2006).

International Search Report, dated Aug. 7, 2013 and Written Opinion, issued in International Application No. PCT/GB2013/050493.

\* cited by examiner

POINT AND CLICK LIGHTING FOR IMAGE BASED LIGHTING SURFACES

CROSS REFERENCE TO RELATED APPLICATIONS

This application claims the priority of PCT/GB2013/050493, filed on Feb. 28, 2013, which claims priority to Great Britain Application No. 1204872.4, filed on Mar. 20, 2012, the entire contents of each of which is fully incorporated herein by reference.

TECHNICAL FIELD

The present invention relates to lighting 3D computer generated models, and more particularly it relates to a method of interacting with the image based lighting surface.

BACKGROUND

As computers get more powerful and 3D rendering software more sophisticated, computers are being used more and more in the creation of photo real images and animation. This computer generated imagery is replacing photography and cinematography in the real world for making images of new product designs, such as consumer goods and cars for marketing and advertising, or for creating virtual characters and visual effects in movies.

The ingredients required to make these images using a computer are 3D geometry representing the physical forms of the objects being visualised, shaders that describe the appearance of the geometry (the materials), virtual cameras which specify the views that are being rendered and finally the light sources creating the illumination. All of these elements are generally contained within a computer file called a 'scene' that can be opened by a 3D software package. 3D software packages let the user create/assemble and adjust these ingredients and then compute images using this data.

In 3D software the scene is represented and interacted with via viewports. These viewports act as windows onto the scene; either views through the cameras, or importantly orthographic views like front, side and top. An example of a typical user interface in existing 3D software is shown in FIG. 1. Users can move around these views; so rotate the camera, zoom in and out. With the orthographic views users can only move up, down, left, and right on a plane and zoom in and out, they are locked to the orthographic projection. The user needs to use all of these different viewports to accurately position objects with the scene. Objects are first selected and then tools used to move their position. The users swaps to the top view to understand the relative position of the objects in the plan view, then the user swaps to the side view to check the height they are placing objects. Placing objects in 3D space using the cameras view is virtually impossible as the user doesn't have the ability to judge height and depth. Using the front, side and top views are essential for placing objects and light sources within a scene.

Until recently these viewports would have been always shown in wireframe or with simple shading. A wireframe view is far faster to compute and this simple representation of the scene enables users to more easily find and interact with the objects when they a represented in this simple manner. Additionally traditional CG lights are represented with icons to show their position, direction, scale, type. These icons could be moved like any other object within the scene. But the CG lights had no physical form, so the icons were needed as a way to place and interact with the lights.

As computing power has increased, only recently has it become common place to have a fully rendered interactive viewport with the real world physical behaviour of lighting transport, reflections and materials delivering an image in real-time, or near real-time, with a quality and feel that is very close to the final production quality rendering. This viewport can be called a 'virtual interactive photograph', where changes to the scene update the virtual photograph straight away. An example of the user interface that includes a real-time rendered view, as well as orthographic views, is shown in FIG. 2.

Lighting in Computer Graphics

There are currently 3 basic technologies for lighting 3D computer generated objects. The first we will call traditional CG light sources. These CG light sources are the oldest technology, coming from the origins of computer graphics. These light sources include; directional (representing parallel light rays form a faraway object, like the sun), spot light, area light and point light. These light sources are represented by icons in the 3D software viewports showing their placement and characteristics.

The next type of light source is an emitter. This is a piece of geometry assigned with a shader with illumination properties. The material may also have transparency properties. The most common emitter form is a rectangular plane with a high dynamic range image mapped on to its surface and an alpha channel perhaps for transparency. Emitters are a more realistic way to light a scene because the light source has a physical form. It can be seen in reflections, just like the real-world. The old fashioned CG light sources create illumination and fake being seen in reflections via a specular component in the shaders of the objects in the scene.

The final type of lighting is image based lighting, which is a kind of emitter that totally surrounds the 3D scene. Every object is contained within this 3D scene, usually a large or infinite sphere, with a high dynamic range image mapped to its surface. This HDR image creates illumination and is seen in reflections. The most common application is to use a high dynamic range spherical photograph of real world location and place this around the scene to create the illusion that the synthetic object is actually within the real world environment.

The processor may be further configured to re-render the scene to be displayed on the display in substantially real-time, subsequent to adjusting the lighting properties of the surface.

Alternatively there are methods allowing users to make their own spherical HDRI maps, placing nodes with properties onto a HDR rectangular canvas to place lighting and effects with their shapes distorted correctly such that the shapes are correctly shown when the image is mapped and distorted onto the lighting sphere. This creation and adjustment of a HDRI lighting map can be done in real-time, and therefore provides a method for real time lighting creation and real-time augmentation and adjustment of existing HDR environments using this interactive HDR canvas. An example of this is described in US 2010/0253685.

There are 2 ways to position the light sources within the scene. The first is to select them and move them using the different orthographic viewports. The user can view the virtual photograph viewport whilst these lighting position changes are happening to judge their effect. Alternatively many software packages allow the user to look from the point of view of the light source and use camera navigation tools to position the light source. But once again this needs to be done in conjunction with the virtual photograph view to see the results of the changes being made.

Now computer rendering is technically able to produce images that are as realistic as photographs, then 3D artists are now looking to photographic lighting techniques to make their images of products and cars look as good as a professional photo shoot. 3D artists are now learning that the placement of reflections of light in their subject matter is just as important as the illumination. The problem is that it's not easy to position illumination and reflections where you want them with the current solutions.

When looking through the light source as a camera or indeed just looking at the 3D scene, the only place you can actually tell if the lighting is being placed correctly is within the virtual photograph viewport, this is where you know if a light is catching the reflection you want. The lighting is totally dependent of the view point of the camera.

Techniques have been shown before based on a concept of painting with light, essentially drawing strokes onto a 3D model to place reflections and illumination—these were mapped back onto a 3D form that surrounded the object. These methods fail to capture many essential ingredients required by the 3D artist wishing to produce professional quality lighting and we feel this is why this approach has not been utilised in 3D software over 5 years after this research was published. Photographers don't light objects by using a paint brush and strokes. Photographers place distinctive 'shapes' in reflections and control the transition of light across these shapes to control their appearance in the subject. Photographers and 3D artists also iterate their lighting many times until they are happy that they have achieved the desired effect. It is therefore a very creative process, and lighting needs to be easily adjustable at all times.

Image based lighting is a powerful lighting technology that is also underutilised with its history as being a method to place an object into a static HDR photographed environment. Image based lighting is a very efficient method for creating realistic lighting and reflections, and can be very interactive. The industry has not fundamentally changed the way we approach lighting computer generated objects since 3D graphics was invented. A new method of lighting 3D objects is needed that is easier and faster than the trial and error methods currently used to try to place reflections and illumination around a 3D object. Users want to put a reflection or place illumination where they want it on an object and fast. Then users want to adjust the placed items easily to try out different lighting ideas. Real-time rendering of very realistic images provides instant feedback on lighting changes which is totally liberating and this is not being taken full advantage of.

SUMMARY

According to a first embodiment of the invention, there is provided a computer implemented method of interacting with a three dimensional image based lighting surface in order to adjust the lighting properties of the surface, the method comprising:
  defining an image plane and a user viewpoint for the lighting surface;
  rendering and displaying on a display of a computer a scene containing an object in situ within the lighting surface taking into account said image plane and said user viewpoint;
  by way of a user interaction with the displayed scene, receiving an identification of a point on the image plane;
  tracing a ray from the user viewpoint through the identified point on the image plane and either,
    determining a surface intersection point of the ray with said surface or
    determining an object intersection point of the ray with said object and tracing a further ray either being a reflection of the ray from the object or being normal to the surface of the object at said object intersection point, and determining a surface intersection point of the further ray with said surface,
  and
  adjusting the lighting properties of the surface at or in the region of the surface intersection point.

Embodiments of the present invention may provide a better approach to creating and adjusting lighting for 3D objects in computer graphics. Embodiments may provide highly interactive, intuitive, precise and fast methods that enable a 3D artist to light an object to a far higher quality than was possible before in a much shorter timescale.

Said lighting surface may be a sphere or a cuboid, and may comprise a photographic or computer generated image.

Said step of adjusting the lighting properties may comprise one of:
  adding, subtracting or modifying the properties of a light source at or in the region of said surface intersection point; and
  adjusting the brightness of the surface at or in the region of said surface intersection point.

The method may further comprise identifying a light source at or in the region of said surface intersection point and receiving further user input with respect to that light source and adjusting the properties of the light source accordingly.

If more than one light source is located at or in the region of said surface intersection point, the user is provided with a means to select the desired lighting source from the more than one lighting source located at or in the region of said surface intersection point.

Said step of adjusting the lighting properties may comprise a step of mapping the geometry of a light source onto the lighting surface, and may comprise tracing rays from the light source to an origin of the lighting surface.

The method may comprise displaying on a display of the computer a canvas being a two dimensional mapping of the three dimensional lighting surface.

Said step of receiving an identification of a point on the image plane may comprise receiving an input on the rendered scene from a user operated pointing device such as a mouse, tablet or touch screen.

The method may comprise, subsequent to said step of adjusting the lighting properties of the surface, re-rendering and displaying the scene using the modified lighting surface in substantially real-time.

According to a second embodiment of the invention there is provided a system configured to interact with a three dimensional image based lighting surface, the system comprising:
  a display configured to display a rendered scene containing an object in situ within the lighting surface taking into account an image plane and a user viewpoint;
  a graphical user interface configured to receive an identification of a point on the image plane by way of a user interaction with the displayed scene; and a processor configured to:

render the scene to be displayed on the display;
    trace a ray from the user viewpoint through the identified point on the image plane and either,
        determine a surface intersection point of the ray with said surface or
        determine an object intersection point of the ray with said object and trace a further ray either being a reflection of the ray from the object or being normal to the surface of the object at said object intersection point, and determine a surface intersection point of the further ray with said surface, and
    adjust the lighting properties of the surface at or in the region of the surface intersection point.

The user interaction with the displayed scene may be by way of a user operated pointing device such as a mouse, tablet or touch screen.

The processor may be further configured to re-render the scene to be displayed on the display in substantially real-time, subsequent to adjusting the lighting properties of the surface.

According to a third embodiment of the invention, there is provided a computer program product comprising a computer readable medium having thereon computer program code, such that, when the computer program code is run, it makes the computer execute a method of interacting with a three dimensional image based lighting surface according to any one of the statements corresponding to the first embodiment above.

According to a fourth embodiment of the invention, there is provided a computer implemented method of interacting with a three dimensional image based lighting surface in order to adjust the lighting properties of the surface, the method comprising:
    defining an image plane and a user viewpoint for the lighting surface;
    rendering and displaying on a display of a computer a scene containing an object in situ within the lighting surface taking into account said image plane and said user viewpoint;
    by way of a user interaction with the displayed scene, receiving an identification of a point on the image plane;
    performing a ray tracing operation through said point on the image plane in order to identify a lighting surface intersection point whereby the lighting properties of the surface at or in the region of that point can be adjusted.

DETAILED DESCRIPTION

As previously discussed, the present methods of lighting 3D computer generated models are somewhat cumbersome. A new method will now be described that enables a user to interact with the lighting environment in a faster, easier and more intuitive way.

Rendering software generates and displays a virtual 'photograph' image of 3D data in real-time, also known as a scene, which takes account of a user viewpoint and image plane to create the scene. The image can show illumination and reflections. This process is called real-time rendering.

The 3D data is lit in the software using an image based lighting method to calculate illumination and reflections. High dynamic range (HDR) image data is mapped onto a 3D object around the scene to provide illumination levels and this high dynamic range image data is also seen in reflections in the 3D data. The high dynamic range image data used in the above is generated in real-time combining referenced HDR image data elements and procedurally generated HDR data elements to calculate a final composite RGBA high dynamic range data set. The location, scale and blending of the referenced elements within the high dynamic range image data can all be adjusted in real-time.

Figure 1:
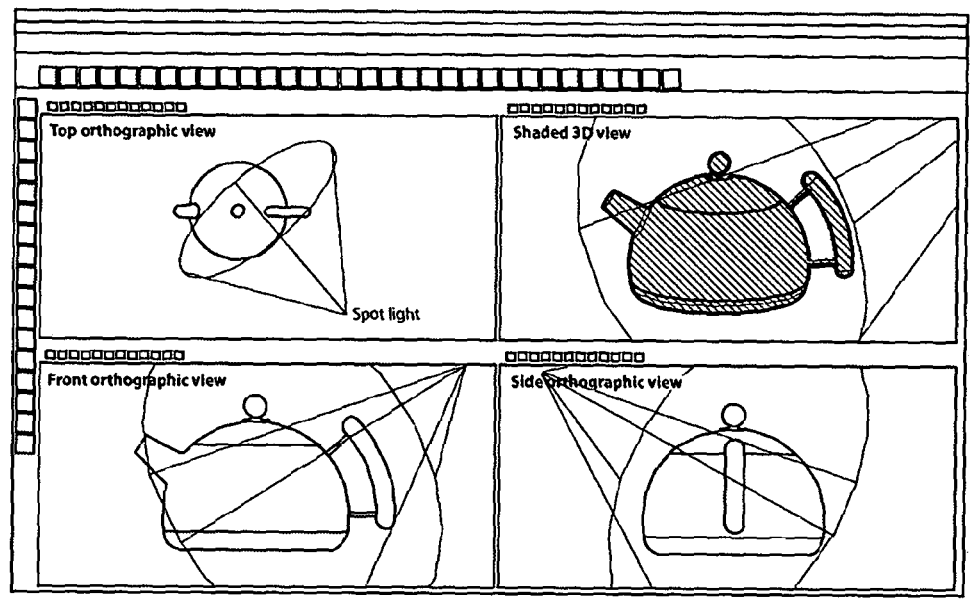
FIG. 1 shows a user interface for known 3D software which includes orthogonal views.
Figure 2:
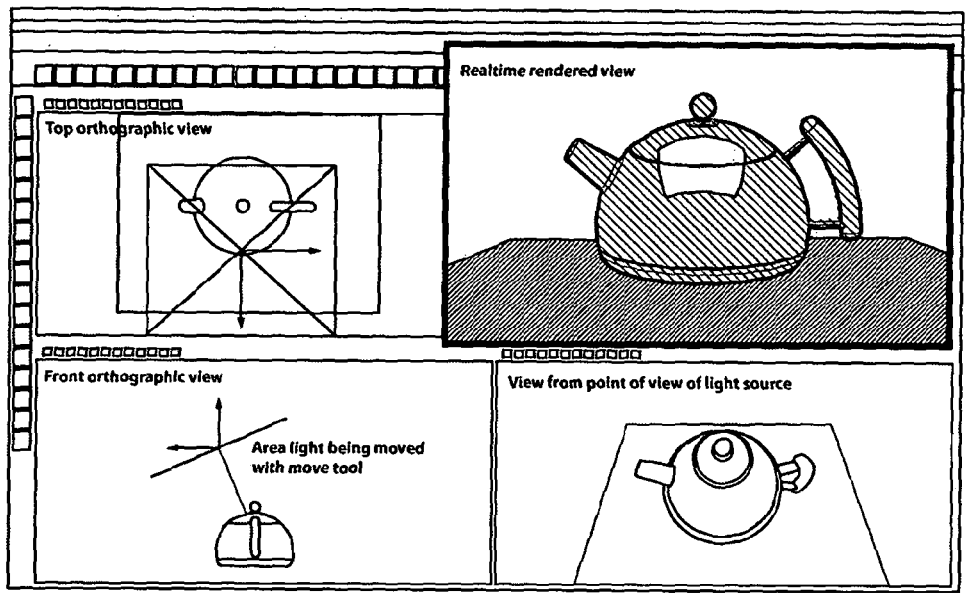
FIG. 2 shows a user interface for known 3D software which includes orthogonal views as well as a real-time rendered view.
Figure 3:
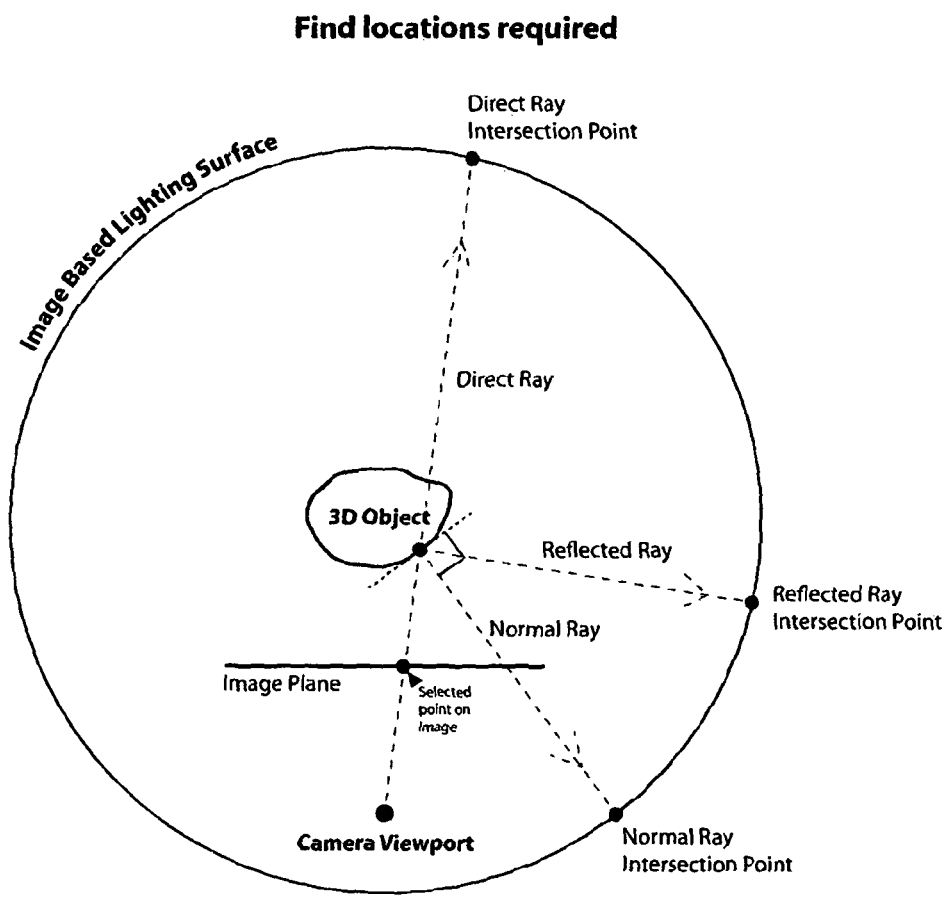
FIG. 3 shows the determination of three locations at the image based lighting surface using rays.

With reference to FIG. 3, the user is provided with a rendered scene that depicts the three dimensional image as viewed from the user viewpoint through the image plane.

The user picks a pixel location on the virtual photograph image, or scene (shown at the "Image plane" in FIG. 3), where an adjustment to the lighting is needed. This selected pixel location on the virtual photograph image gives the software an identification of a point on the image plane which is used to calculate one of three locations on the high dynamic range image data used to light the scene. All three locations are determined by starting with an initial ray that passes from the user viewpoint (shown as camera viewpoint on FIG. 3), through the identified point on the image plane corresponding to the pixel location on the scene selected by the user, and intersects with the 3D object at an object intersection point.

One location is known as the Direct position. To determine the direct position, the initial ray simply continues through the object in the same direction until it intersects the image based lighting surface ("Direct Ray Intersection Point"). This location on the HDR data image is the direct position.

A second location is known as the Illumination position. To determine the illumination position, a further ray (the "normal ray" in FIG. 3) is traced from the object intersection point in the normal direction, until it intersects the image based lighting surface ("Normal Ray Intersection Point"). This location on the HDR data image is the illumination position.

A third location is known as the reflection position. To determine the reflection position, a further ray (the "reflected ray" in FIG. 3) is traced from the object intersection point as a reflection of the initial ray through the normal at the object intersection point on the geometry until it intersects the image based lighting surface ("Reflection Ray Intersection Point"). This location on the HDR data image is the reflection position.

Using these three determined locations, it is possible to interact with the lighting environment of the 3D object. For example:
- Select the elements in the high dynamic range image data set that contribute to illuminating or reflecting in the pixel selected.
- Move data elements in the high dynamic range image data to illuminate or reflect in that pixel.
- Move elements in the high dynamic range data to the new direct position selected.

The method described above enables real-time lighting design directly onto a real-time rendered image.

Figure 4:
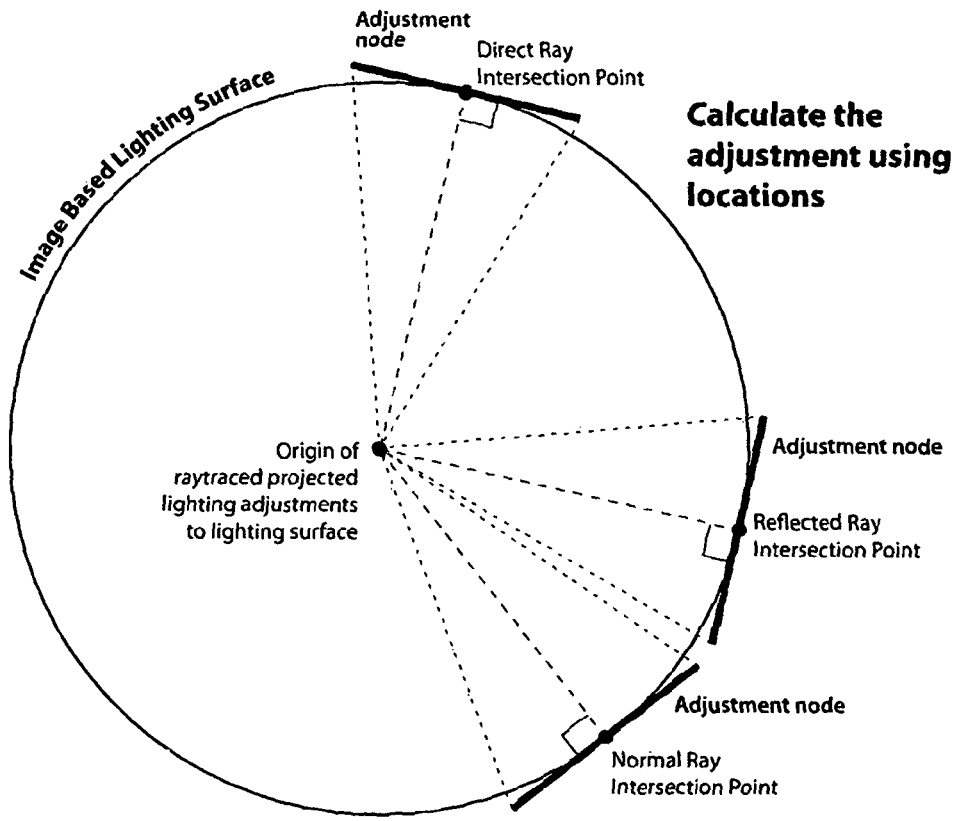
FIG. 4 shows mapping of lighting sources onto a spherical lighting surface.

When lighting is added to the lighting design, these are known as lighting nodes or lighting sources. They can be added to a position on the image based lighting surface using the methods described above. The lighting sources have a geometry, or shape, that must be mapped onto the spherical surface of the lighting surface. FIG. 4 shows three lighting sources, one at each of the intersection points. The lighting sources show on FIG. 4 as straight lines that touch the lighting surface at the intersection points. In order to incorporate the lighting source into the lighting surface, the geometry of the source must be mapped onto the spherical shape of the lighting surface. As can be seen from FIG. 4, this is done by tracing rays (adjustment rays) from points in the lighting source (just two outer points, indicating the edges of the lighting source are shown in FIG. 4) back to the origin of the ray that traced the projected lighting adjustments to the surface. The lighting source geometry is then mapped onto the spherical lighting surface at the points at which the adjustment rays pass through it.

Some of the possible interactions that the user is able to make will now be described in greater detail.

Moving Lighting Sources on the HDR Canvas using Reflection Mode

Figure 5:
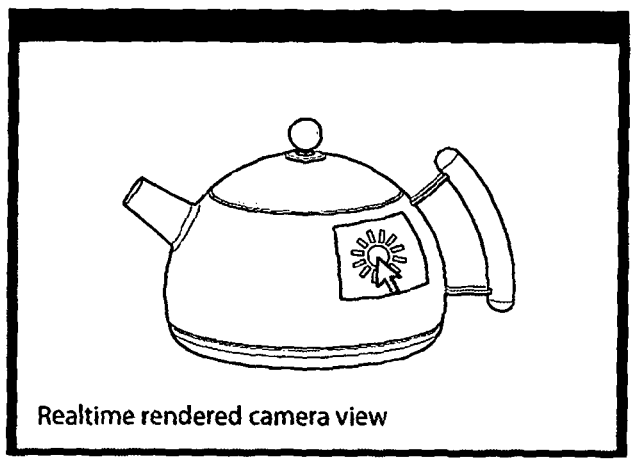
FIG. 5 shows a real-time rendered camera view with which a user is interacting.
Figure 6:
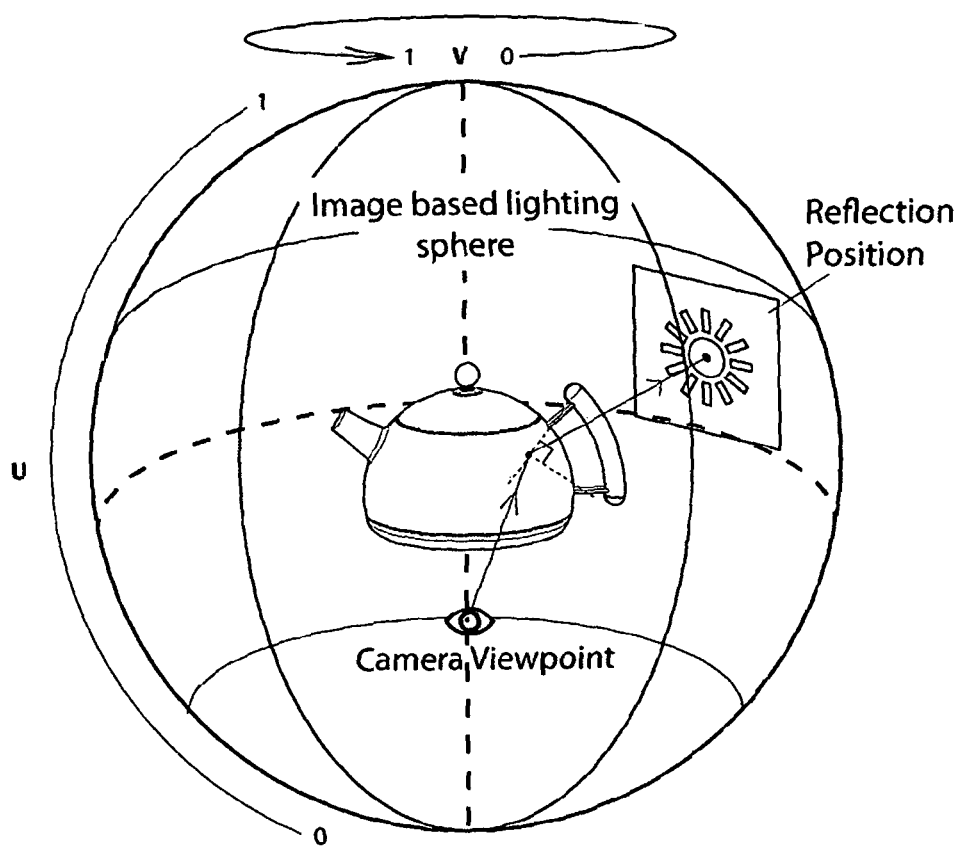
FIG. 6 shows the image based lighting sphere resulting from the user input shown in FIG. 5.
Figure 7:
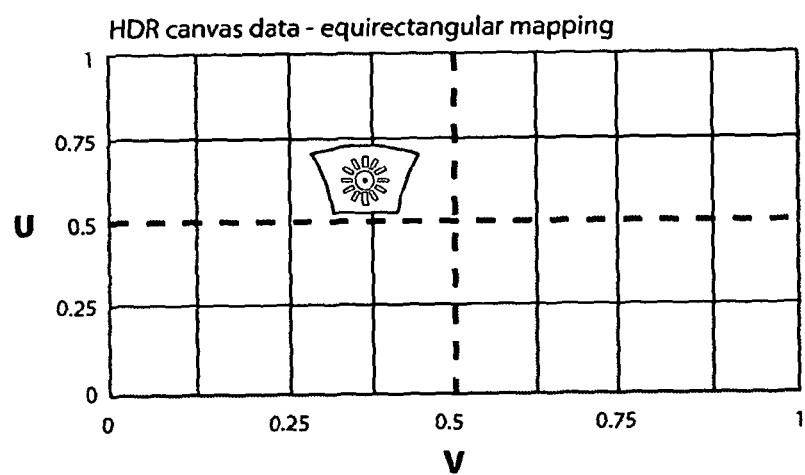
FIG. 7 shows the HDR canvas of the lighting sphere of FIG. 6.

As shown in FIG. 5, the user clicks on the model in the rendered view at the point where they would like a selected lighting source to be seen in the reflection. As shown in FIG. 6, the software looks at the geometry under this pixel location and generates a reflection ray from the camera viewpoint to this point on the 3-D object and bounces this reflection ray until it intersects with the image based lighting sphere. This provides the exact location where the lighting source needs to be moved to. The software instantly moves the lighting source to this UV position on the HDR canvas, shown in FIG. 7, and generates new HDR data with the lighting source in this new position and correctly distorting its shape for spherical mapping. The rendered view is updated with this new HDR data instantly and re-rendered with the lighting source seen instantly in the position where the user clicked.

Figure 8:
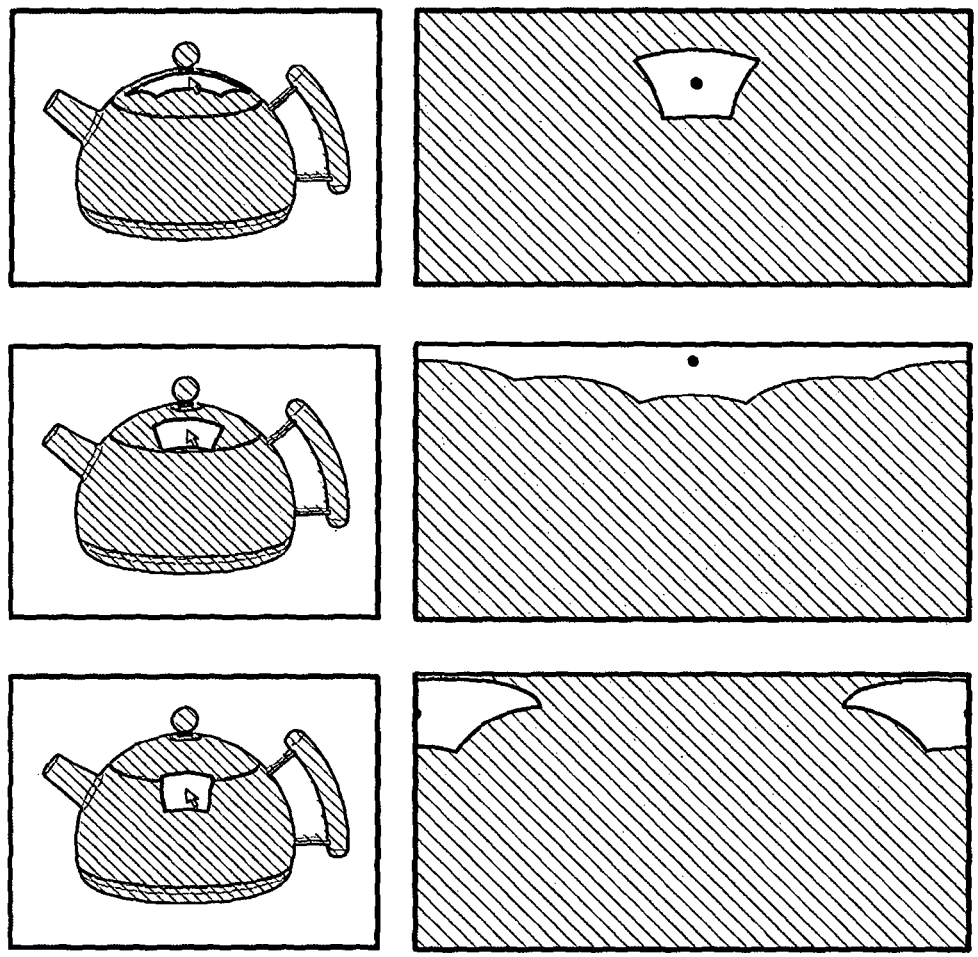
FIG. 8 shows rendered views and corresponding HDR canvasses for lighting sources at three different positions.

The user could click and drag the lighting source around by its reflection until it is in the most desirable position. This is shown in FIG. 8, where the rendered view and the corresponding HDR canvas are shown for a reflection that is moved by the user at three different positions.

Moving Lighting Sources on the HDR Canvas using Reflection Mode

Figure 9:
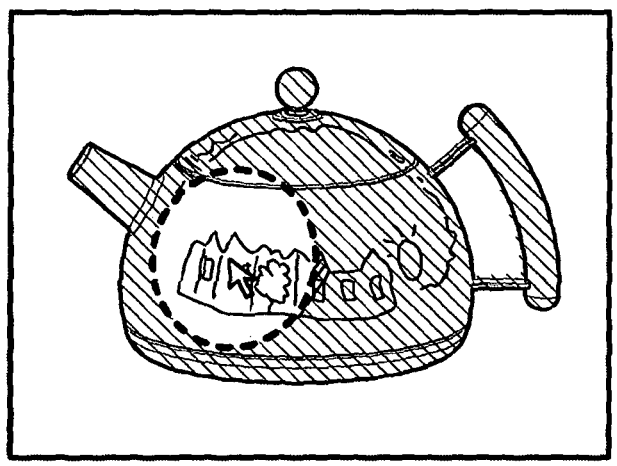
FIG. 9 shows an object in a rendered image with a user interacting with the light properties within the rendered image.
Figure 10:
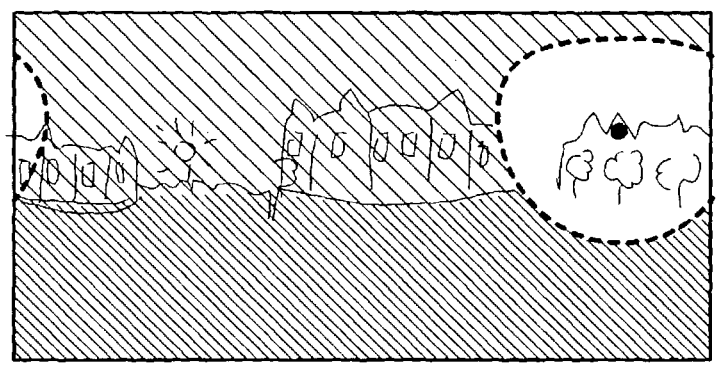
FIG. 10 shows the HDR canvas corresponding to the rendered image of FIG. 9.
Figure 11:
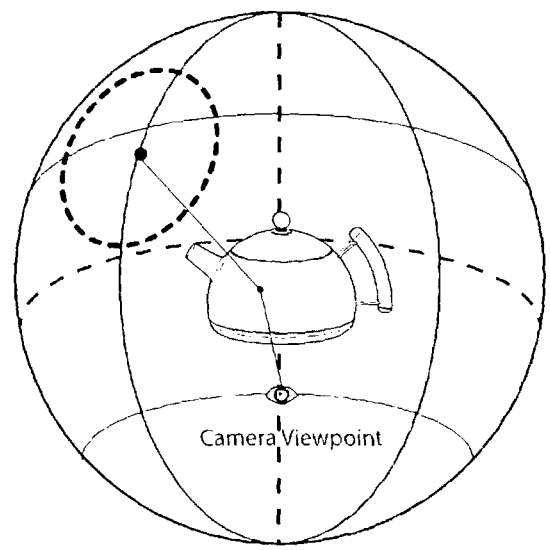
FIG. 11 shows a representation of the spherical light surface for the rendered image of FIG. 9.

In FIG. 9, the user is clicking on the rendered view to move the lighting source into a new position. This lighting source is brightening the exposure of the HDR background under the source on the canvas, as shown in FIG. 10. FIG. 11 shows the corresponding image based lighting sphere. Lighting sources can be any shape, brightness and colour across their shape, transparency across their shape, and blend with content underneath and use masks too. A lighting source can be used to make local adjustments to existing HDR data.

The user can much more quickly, easily and efficiently interact with the lighting by directly driving the positioning and selection of these lighting sources by interacting with the 3D rendered view and placing the sources based on illumination and reflection modes. The user puts the changes where they see they want them in order to create a more pleasing appearance, using a sophisticated source based non-destructive editing and creation environment for HDR illumination and reflection data for computer graphics.

Figure 12:
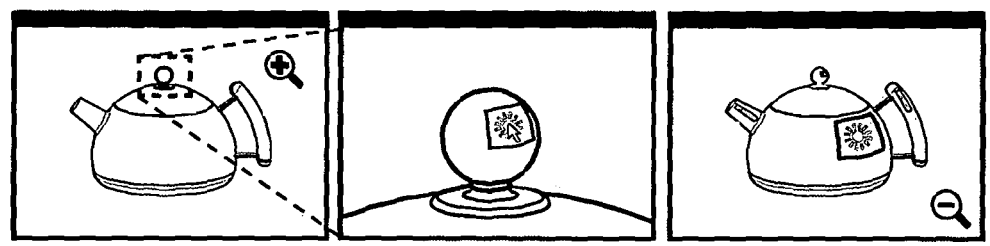
FIG. 12 shows detailed placement of a lighting source using reflection at a zoomed in portion of the scene.

Accurate Positioning of Lighting Sources on the HDR Canvas using Zoom and Reflection Mode As shown in FIG. 12, the user selects a region of the view to zoom into. The user then positions a lighting source using reflection mode on a detailed area. The camera view has not been moved at all, the view is still an area of the original view but zoomed in, so reflection placements made here will be in the same place when zoomed out to see the full view again. When the user zooms out, the full effect of that precision placement can be seen, including reflections on other parts of the object caused by the same lighting source added.

Moving Lighting Sources on the HDR Canvas using Illumination Mode

Illuminating the same place on the model as a reflection will require a light source in a very different position to reflection mode.

Figure 13:
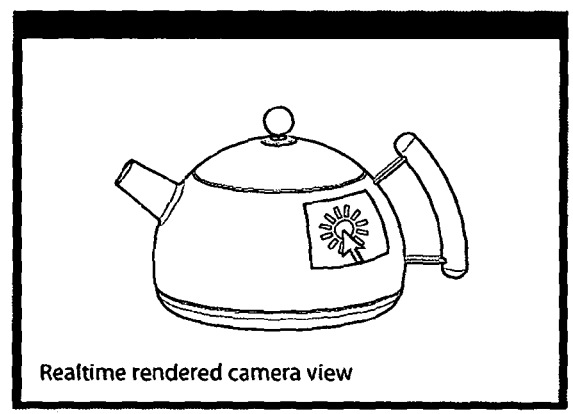
FIG. 13 shows a real-time rendered camera view with which a user is interacting.
Figure 14:
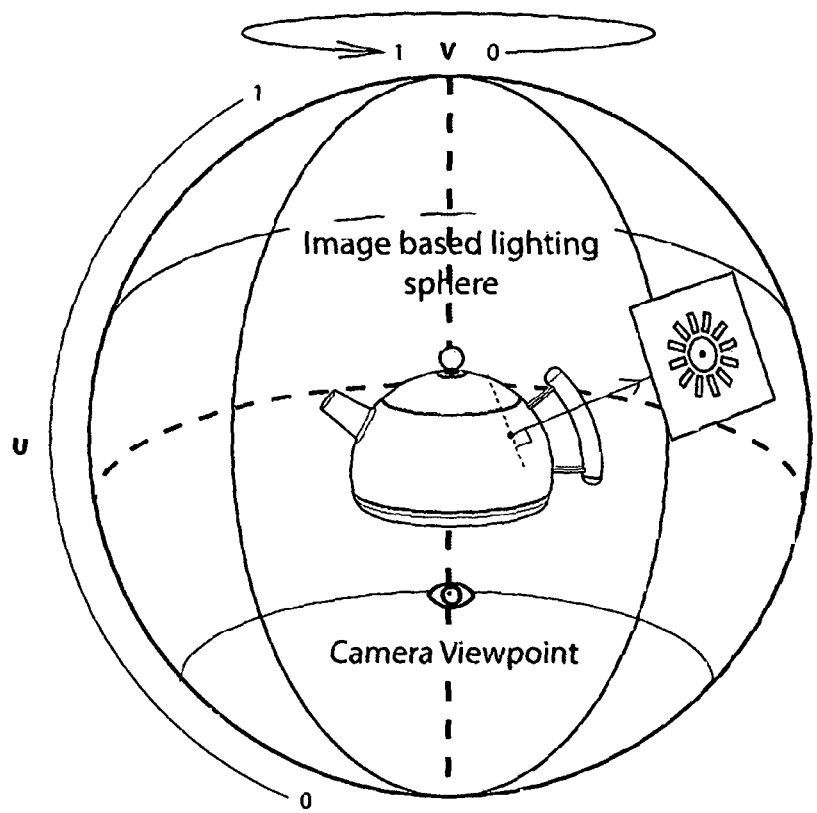
FIG. 14 shows the image based lighting sphere resulting from the user input shown in FIG. 13.

As shown in FIG. 13, the user clicks on the model in the rendered view where the user wants the selected lighting source to illuminate the model. As shown in FIG. 14, the software looks at the geometry under this pixel location and generates a ray normal to this geometry that intersects the image based lighting sphere. This intersection provides the exact location where a lighting source needs to be added or moved to.

Figure 15:
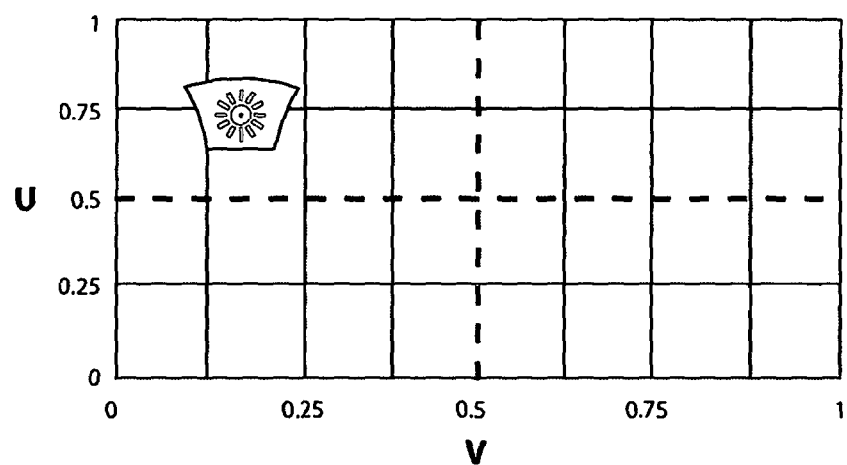
FIG. 15 shows the HDR canvas of the lighting sphere of FIG. 14.

The software instantly adds or moves a lighting source to this UV position on the HDR canvas, shown in FIG. 15, and generates new HDR data with the lighting source in this new position and correctly distorts its shape for spherical mapping.

The rendered view is updated with this new HDR data instantly and re-rendered with the lighting source seen instantly illuminating the position where the user clicked. The user could click and drag the lighting source around to place illumination where they want it.

Selecting Lighting Sources on the HDR Canvas using Reflection Mode

As the user can now place lights directly onto the model with greater accuracy, it is expected that the user will probably place a lot more lights than with traditional lighting techniques. This is further expected as placing tiny reflection details boosts the dynamic feel of a render, giving it a feel that is much closer to a real photograph.

Keeping track of the position of each light source and its effect would be very difficult, and would be very data and processor intensive. Therefore, allowing the user to select the lighting sources using this method directly from the 3D rendered model is beneficial in order to allow the user to easily continue editing and adjusting the lighting and reflection environment.

Figure 16:
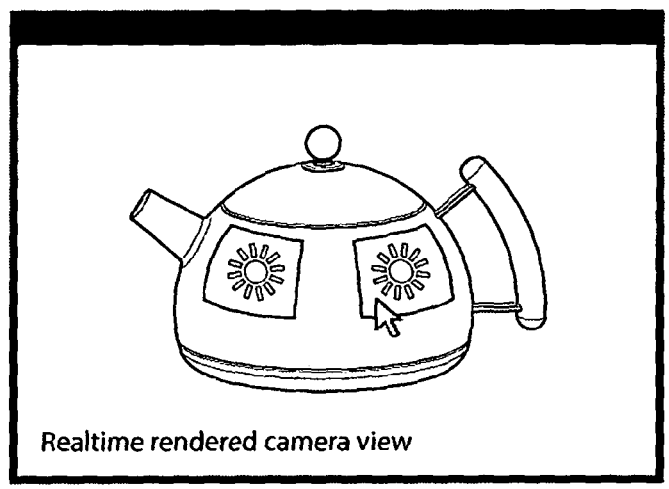
FIG. 16 shows a real-time rendered camera view with which a user is interacting.
Figure 17:
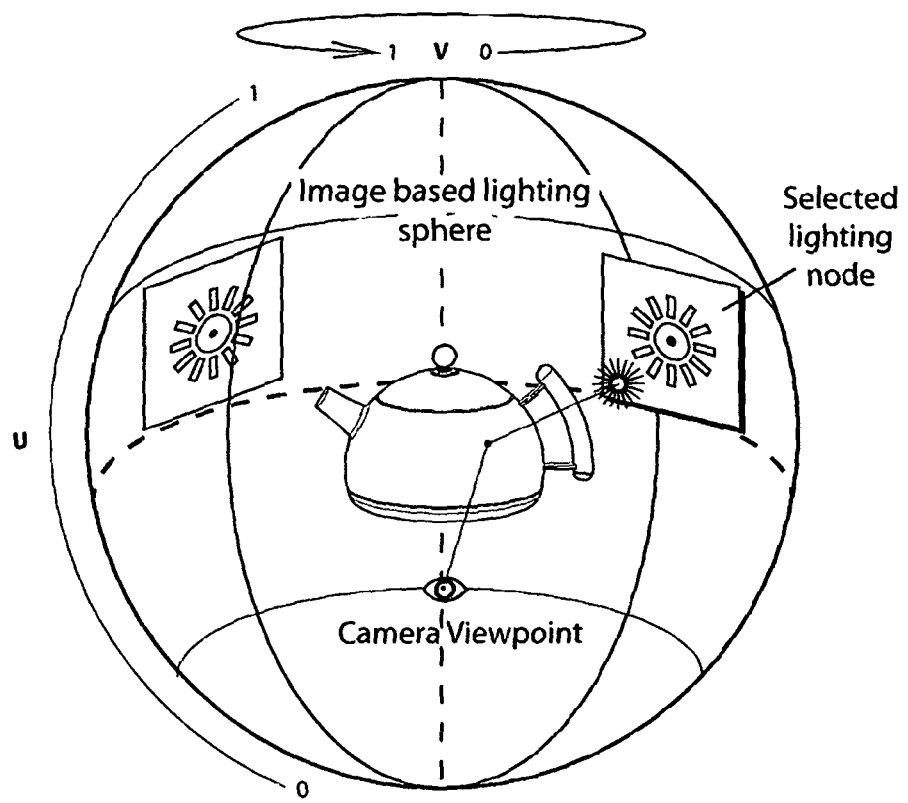
FIG. 17 shows the image based lighting sphere resulting from the user input shown in FIG. 16.
Figure 18:
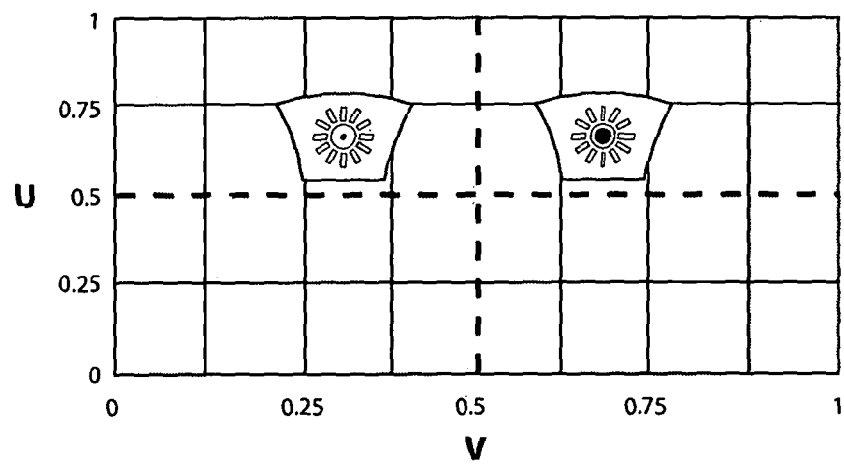
FIG. 18 shows the HDR canvas of the lighting sphere of FIG. 17.

As shown in FIG. 16, the user clicks on the model in the rendered view on the lighting source reflection that they wish to select. The software looks at the geometry under this pixel location and generates a ray, as shown in FIG. 17, from the camera view point to this point on the 3D object and bounces a reflection ray until it intersects with the image based lighting sphere. The software then does a hit test to check which light source is under this UV location and selects it. The user can now adjust the location and properties of the selected lighting source. FIG. 18 shows the selected lighting source on the HDR canvas.

Figure 19:
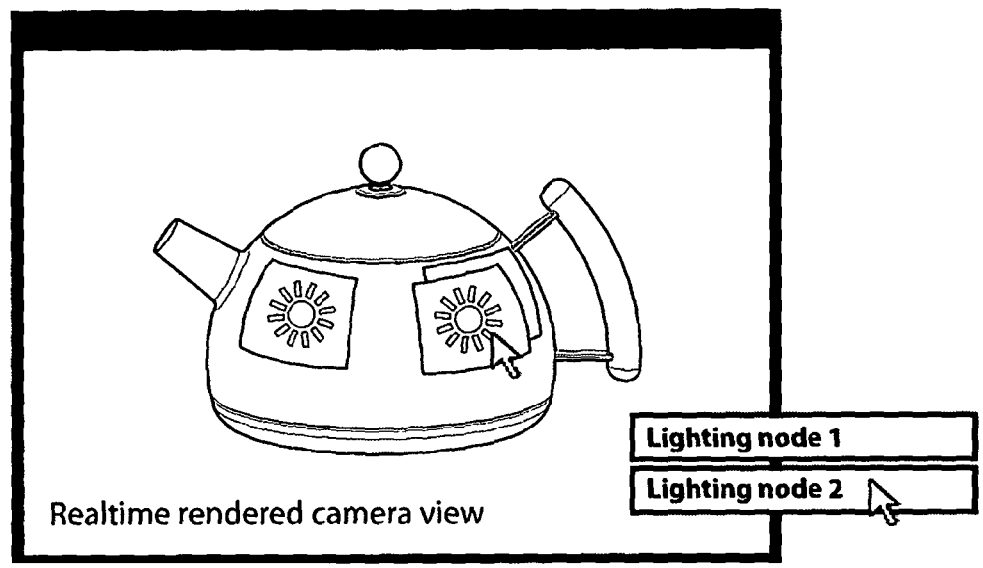
FIG. 19 shows a real-time rendered camera view with which a user is interacting.
Figure 20:
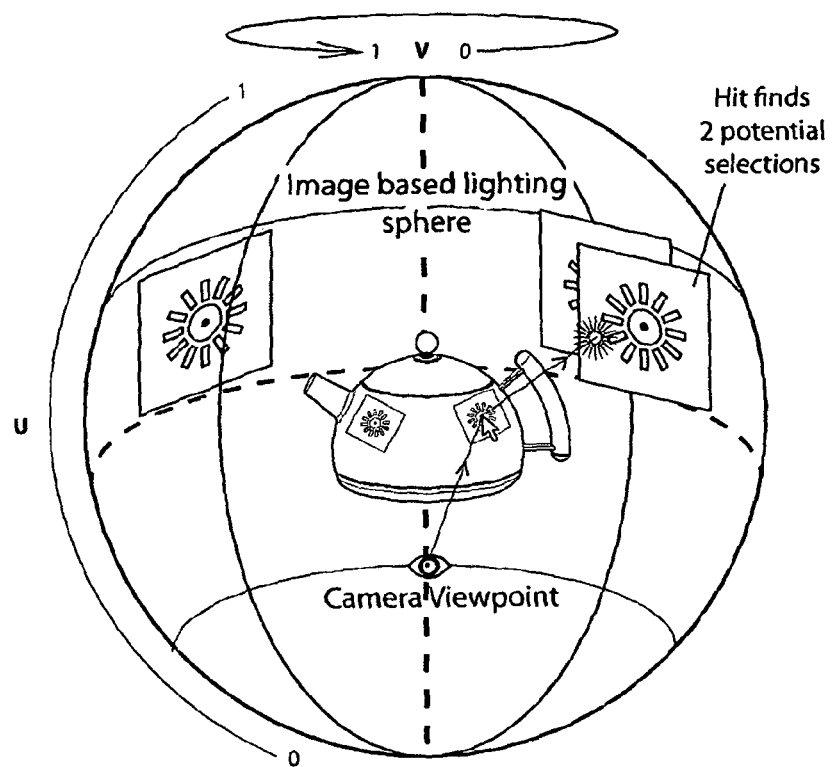
FIG. 20 shows the image based lighting sphere resulting from the user input shown in FIG. 19.
Figure 21:
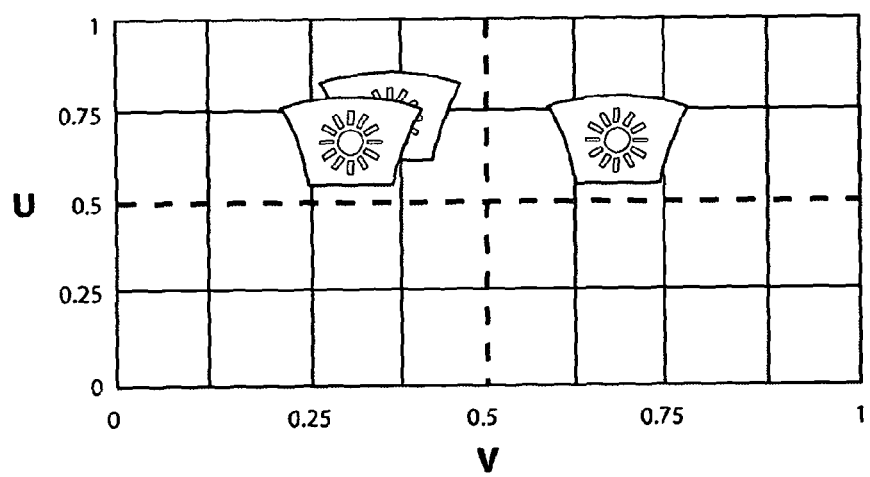
FIG. 21 shows the HDR canvas of the lighting sphere of FIG. 20.

Selecting Lighting Sources on the HDR Canvas using Reflection Mode when There are Layered Lighting Sources In a similar way to the previous method, the user clicks on the model in the rendered view on the lighting source's reflection that they wish to select (FIG. 19). The software looks at the geometry under this pixel location, as shown in FIG. 20, and generates a ray from the camera view point to this point on the 3D object and bounces a reflection ray until it intersects with the image based lighting sphere. The software does a hit test to check which lights are under this location. Now, as there are two possible lighting sources located at this position on the lighting sphere, the software provides a list of light sources for the user to choose from, as shown in FIG. 19, in order to select the lighting source they want to adjust. FIG. 21 shows the HDR canvas for the situation where two lighting sources are layered on the lighting surface.

Figure 22:
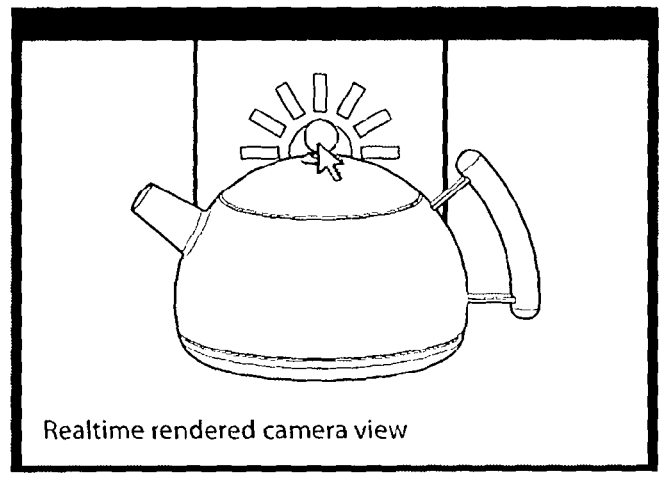
FIG. 22 shows a real-time rendered camera view with which a user is interacting.
Figure 23:
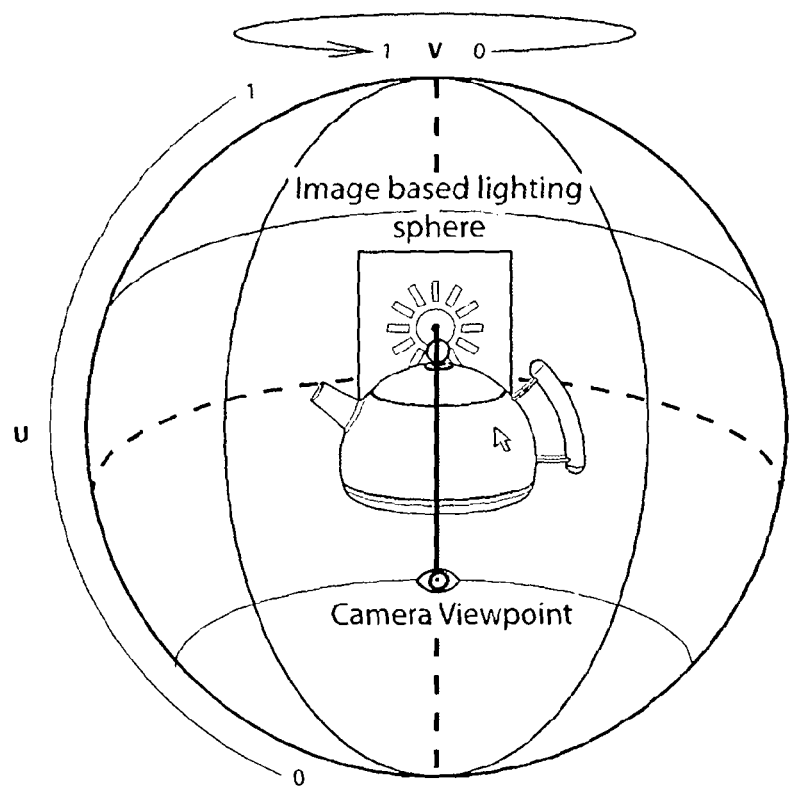
FIG. 23 shows the image based lighting sphere resulting from the user input shown in FIG. 22.
Figure 24:
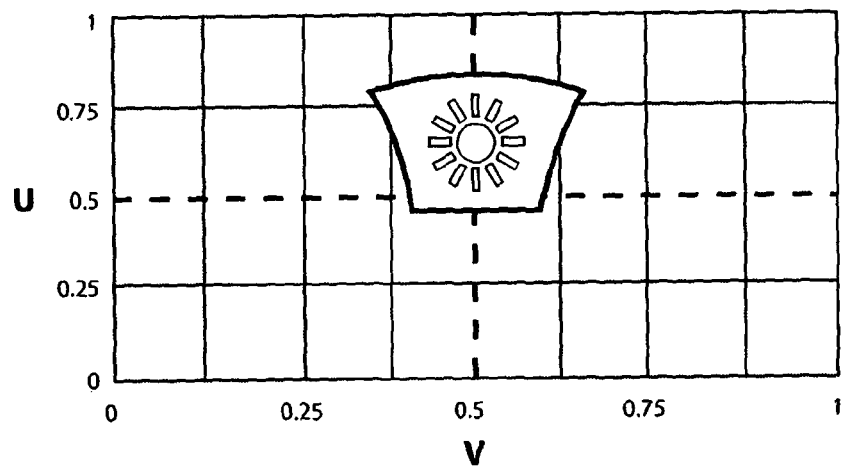
FIG. 24 shows the HDR canvas of the lighting sphere of FIG. 23.

Placing Lighting Sources Directly onto the Image Based Lighting Sphere in the Rendered View In this mode, as shown in FIG. 22, the user simply clicks in the rendered camera view and the position where the user clicks is calculated as a position on the image based lighting sphere seen in the background. The selected lighting source is then added or moved to this location. FIGS. 23 and 24 show the image based lighting sphere and HDR canvas respectively for this situation.

This allows the user to rim light (backlight) objects easily or use the camera to look inside the lighting sphere and click on the sphere at any time to place a source in that position, or select an existing source directly.

Figure 25:
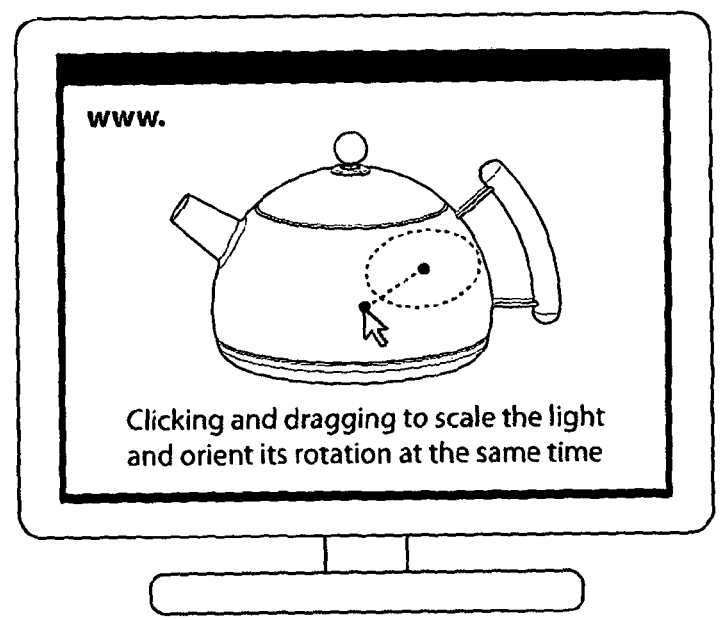
FIG. 25 shows a user interacting with a real-time rendered camera view with a cursor on a computer.
Figure 26:
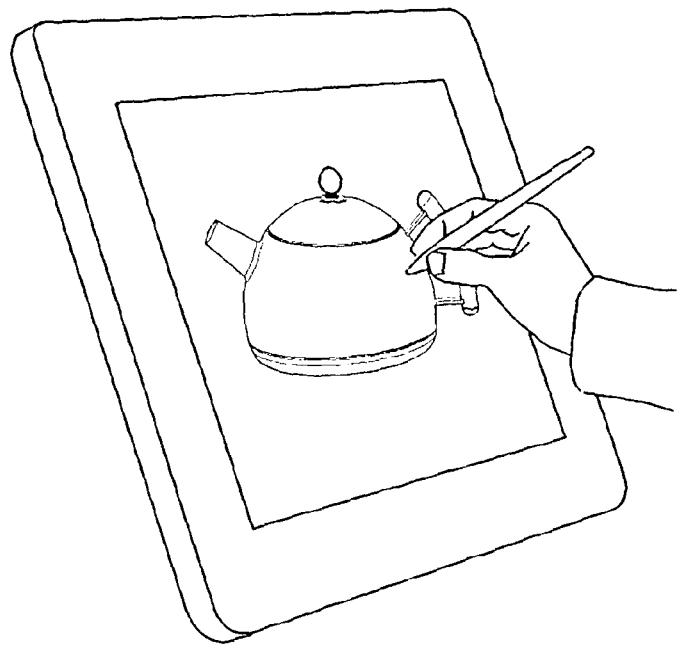
FIG. 26 shows a user interacting with a real-time rendered camera view using a tablet and stylus.
Figure 27:
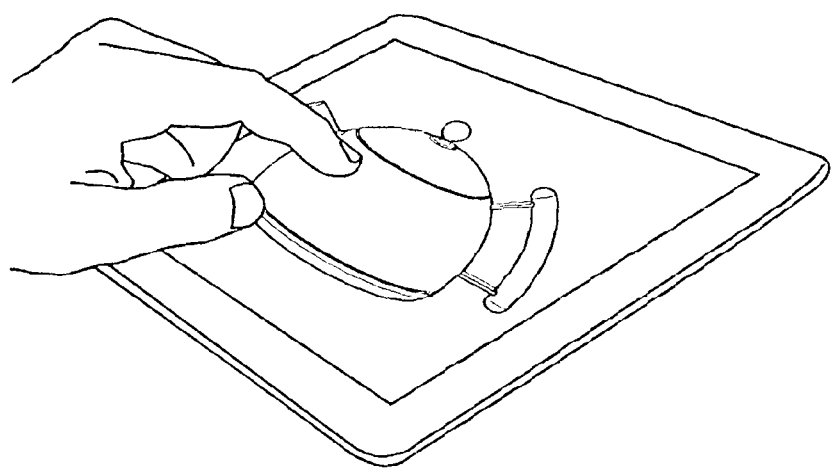
FIG. 27 shows a user interacting with a real-time rendered camera view using a touch screen device.

Selecting lighting nodes using reflections means that it is possible to use this new method without ever needing to show the HDR canvas to the user at all. All decisions can be made directly on the 3D model, for example regarding position, scaling, brightness, colour etc. This saves a lot of screen space within software in which it is implemented. This also means that the system can be used to deliver lighting technology control through a far simpler interface, even over the Internet, on tablets or mobile devices. FIG. 25 shows the method implemented on a desktop computer through a browser, with the user interacting with the lighting of the rendered view using a mouse cursor. Additionally because the rendered view itself is being interacted with, it is not limited to clicking, and so this can be done not only using a mouse cursor, but also other user inputting means, for example using a finger on a touch screen, or a tablet and stylus such as those widely used by computer graphic designers, for example a Wacom™ tablet etc. FIG. 26 shows the method implemented using a tablet and stylus. FIG. 27 shows the method implemented on a touch screen device, which the user interacting with the lighting of the rendered view using a finger. Any user input that enables the user to touch and drag on the rendered view will be useable with the methods described herein.

Using the described methods, the user will feel like they are lighting a final image by interacting directly with the image itself. It is not intended that the methods themselves will adjust the properties of lighting sources. It is expected that the methods of interacting with the rendered view described herein will allow direct manipulation of some lighting source properties, for example scale, shape, brightness, and colour. For example clicking and dragging or using multitouch input on a touch screen device to scale the light and orient its rotation at the same time.

It will be appreciated by the person of skill in the art that various modifications may be made to the above described methods and embodiments without departing from the scope of the present invention.

The invention claimed is:

1. A computer implemented method of interacting with a three dimensional image based lighting surface in order to adjust the lighting properties of the surface, the method comprising:
   defining an image plane and a user viewpoint for the lighting surface;
   rendering and displaying on a display of a computer, a three-dimensional scene containing an object in situ within the lighting surface, taking into account said image plane and said user viewpoints;
   by way of user interaction with the displayed three-dimensional scene, receiving an identification of a selected point on the image plane;
   tracing a ray from the user viewpoint through the identified selected point on the image plane and either,
      determining a surface intersection point of the ray with said lighting surface, or
      determining an object intersection point of the ray with said object and tracing a further ray either being a reflection of the ray from the object or being normal to the surface of the object at said object intersection point, and determining a surface intersection point of the further ray with said lighting surface;
   generating coordinate data representative of a location within a canvas, being a two-dimensional mapping of said lighting surface, of said surface intersection point, and using said coordinate data to adjust, within said canvas, the lighting properties of the lighting surface in the region of the surface intersection point either by
adding, at coordinates within said two-dimensional canvas corresponding to the region of said surface intersection point, a light source having a geometry including mapping the geometry of the light source onto the three dimensional image based lighting surface, or
selecting, at coordinates within said two-dimensional canvas corresponding to the region of said surface intersection point, a light source having a geometry and subtracting the selected light source or modifying the properties of the selected light source;
and
updating in substantially real-time, said three-dimensional scene displayed on said display of said computer using the lighting surface having adjusted lighting properties within the canvas.

2. A method as claimed in claim 1, wherein said lighting surface is a sphere or a cuboid.

3. A method as claimed in claim 1, wherein said lighting surface comprises a photographic or computer generated image.

4. A method as claimed in claim 1, wherein, if more than one light source is located at or in the region of said surface intersection point, said step of selecting a light source comprises providing the user with a means to select the desired light source from the more than one light source located at or in the region of said surface intersection point.

5. A method as claimed in claim 1, wherein said step of mapping comprises tracing rays from an added light source to an origin of the lighting surface.

6. A method as claimed in claim 1 and comprising displaying on the display of the computer, the canvas.

7. A method as claimed in claim 1, wherein said step of receiving an identification of a point on the image plane comprises receiving an input on the rendered scene from a user operated pointing device such as a mouse, tablet or touch screen.

8. A system configured to interact with a three dimensional image based lighting surface in order to adjust the lighting properties of the lighting surface, the system comprising:
a display configured to display a three-dimensional rendered scene containing an object in situ within the lighting surface taking into account an image plane and a user viewpoint;
a graphical user interface configured to receive an identification of a selected point on the image plane by way of a user interaction with the displayed three-dimensional scene; and
a processor configured to:
render the scene to be displayed on the display;
trace a ray from the user viewpoint through the identified selected point on the image plane and either, determine a surface intersection point of the ray with said lighting surface, or
determine an object intersection point of the ray with said object and trace a further ray either being a reflection of the ray from the object or being normal to the surface of the object at said object intersection point, and determine a surface intersection point of the further ray with said lighting surface,
generate coordinate data representative of a location within a canvas, being a two-dimensional mapping of said lighting surface, of said surface intersection point, and using said coordinate data to adjust, within said canvas, the lighting properties of the lighting surface in the region of the surface intersection point, either by
adding, at coordinates within said two-dimensional canvas corresponding to the region of said surface intersection point, a light source having a geometry, and mapping the geometry of the light source onto the three dimensional image based lighting surface, or
selecting, at coordinates within said two-dimensional canvas corresponding to the regiof of said surface intersection points, a light source having a geometry and subtracting the selected light source or modifying the properties of the selected light source; and
update in substantially real-time, said three-dimensional scene displayed on said display of said computer using the lighting surface having adjusted lighting properties within the canvas.

9. A system as claimed in claim 8, wherein the user interaction with the displayed scene is by way of a user operated pointing device such as a mouse, tablet or touch screen.

10. A computer implemented method of interacting with a three dimensional image based lighting surface in order to adjust the lighting properties of the surface, the method comprising:
defining an image plane and a user viewpoint for the lighting surface;
rendering and displaying on a display of a computer a three-dimensional scene,
receiving an identification of a selected point on the image plane;
performing a ray tracing operation from the user viewpoint through said selected point on the image plane in order to identify a lighting surface intersection point;
generating coordinate data representative of a location within a canvas, being a two-dimensional mapping of said lighting surface, of said surface intersection point, and using said coordinate data to adjust, within said canvas, the lighting properties of the lighting surface in the region of the surface intersection point, either by
adding, at coordinates within said two-dimensional canvas corresponding to the region of said surface intersection point, a light source having a geometry, and mapping the geometry of the light source onto the three dimensional image based lighting surface represented by said two-dimensional canvas, or
selecting, at coordinates within said two-dimensional canvas corresponding to the region of said surface intersection point, a light source having a geometry and subtracting the selected light source or modifying the properties of the selected light source; and
updating in substantially real-time, said three-dimensional scene displayed on said display of said computer using the lighting surface having adjusted lighting properties within the canvas.

* * * * *